(12) United States Patent
Budden et al.

(10) Patent No.: US 12,277,497 B2
(45) Date of Patent: *Apr. 15, 2025

(54) REINFORCEMENT LEARNING USING DISTRIBUTED PRIORITIZED REPLAY

(71) Applicant: DeepMind Technologies Limited, London (GB)

(72) Inventors: David Budden, London (GB); Gabriel Barth-Maron, London (GB); John Quan, London (GB); Daniel George Horgan, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,753

(22) Filed: Apr. 6, 2023

(65) Prior Publication Data

US 2023/0252288 A1      Aug. 10, 2023

Related U.S. Application Data

(63) Continuation of application No. 16/641,751, filed as application No. PCT/EP2018/079566 on Oct. 29, 2018, now Pat. No. 11,625,604.

(Continued)

(51) Int. Cl.
*G06N 3/08* (2023.01)
*G06N 3/04* (2023.01)
(Continued)

(52) U.S. Cl.
CPC ............... *G06N 3/08* (2013.01); *G06N 3/04* (2013.01); *G06N 3/088* (2013.01); *G06N 20/00* (2019.01)

(58) Field of Classification Search
CPC ............ G06N 3/08; G06N 3/088; G06N 3/02
See application file for complete search history.

(56) References Cited

U.S. PATENT DOCUMENTS 11,625,604 B2 * 4/2023 Budden .................... G06N 3/04
                                                                706/25
2016/0232445 A1   8/2016 Srinivasan et al.
(Continued)

FOREIGN PATENT DOCUMENTS

CN       103248693        8/2013
CN       105637540        6/2016
(Continued)

OTHER PUBLICATIONS

Abadi et al., "TensorFlow: Large-Scale Machine Learning on Heterogeneous Distributed Systems," https://arxiv.org/abs/1603.04467, Mar. 2016, 19 pages.

(Continued)

*Primary Examiner* — Manuel L Barbee
(74) *Attorney, Agent, or Firm* — Fish & Richardson P.C.

(57) ABSTRACT

Methods, systems, and apparatus, including computer programs encoded on computer storage media, for training an action selection neural network used to select actions to be performed by an agent interacting with an environment. One of the systems includes (i) a plurality of actor computing units, in which each of the actor computing units is configured to maintain a respective replica of the action selection neural network and to perform a plurality of actor operations, and (ii) one or more learner computing units, in which each of the one or more learner computing units is configured to perform a plurality of learner operations.

20 Claims, 3 Drawing Sheets

Related U.S. Application Data

(60) Provisional application No. 62/578,384, filed on Oct. 27, 2017.

(51) Int. Cl.
  G06N 3/088 (2023.01)
  G06N 20/00 (2019.01)

(56) References Cited

U.S. PATENT DOCUMENTS

| | | | | |
|---|---|---|---|---|
| 2017/0286860 | A1* | 10/2017 | Chen | G06N 3/08 |
| 2020/0234117 | A1* | 7/2020 | Hafner | G06N 3/08 |

FOREIGN PATENT DOCUMENTS

| | | |
|---|---|---|
| CN | 106056213 | 10/2016 |
| CN | 107209872 | 9/2017 |

OTHER PUBLICATIONS

Alain et al., "Variance Reduction in SGD by Distributed Importance Sampling," https://arxiv.org/abs/1511.06481v1, Nov. 2015, 14 pages.

Babaeizadeh et al., "Reinforcement Learning through Asynchronous Advantage Actor-Critic on a GPU," https://arxiv.org/abs/1611.06256v3, last revised Mar. 2017, 12 pages.

Barth-Maron et al., "Distributed Distributional Deterministic Policy Gradients," https://arxiv.org/abs/1804.08617, Apr. 2018, 16 pages.

Bellemare et al., "A Distributional Perspective on Reinforcement Learning," https://arxiv.org/abs/1707.06887, Jul. 2017, 19 pages.

Bellemare et al., "The Arcade Learning Environment: An Evaluation Platform for General Agents," J. Artif. Intell. Res. (JAIR), Jun. 2013, 47:253-279.

Clemente et al., "Efficient Parallel Methods for Deep Reinforcement Learning," https://arxiv.org/abs/1705.04862, May 2017, 9 pages.

Dean et al., "Large Scale Distributed Deep Networks," Proceedings of the 25th International Conference on Neural Information Processing Systems, Dec. 2012, 9 pages.

Deng et al., "ImageNet: A Large-Scale Hierarchical Image Database," 2009 IEEE Conference on Computer Vision and Pattern Recognition, Jun. 2009, 248-255.

Gruslys et al., "The Reactor: A Sample-Efficient Actor-Critic Architecture," https://arxiv.org/abs/1704.04651v1, Apr. 2017, 12 pages.

Hastings, "Monte Carlo Sampling Methods Using Markov Chains and Their Applications," Biometrika, Apr. 1970, 57(1):97-109.

Heess et al., "Emergence of Locomotion Behaviours in Rich Environments," https://arxiv.org/abs/1707.02286, Jul. 2017, 14 pages.

Hessel et al., "Rainbow: Combining Improvements in Deep Reinforcement Learning," https://arxiv.org/abs/1710.02298, Oct. 2017, 14 pages.

Hester et al., "Learning from Demonstrations for Real World Reinforcement Learning," https://arxiv.org/abs/1704.03732v1, Apr. 2017, 11 pages.

Hinton, "To recognize shapes, first learn to generate images," Progress in Brain Research, 2007, 165:535-547.

Horgan et al., "Distributed Prioritized Experience Replay," https://arxiv.org/abs/1803.00933, Mar. 2018, 19 pages.

Jaderberg et al., "Reinforcement Learning with Unsupervised Auxiliary Tasks," https://arxiv.org/abs/1611.05397, Nov. 2016, 14 pages.

Kaiser et al., "One Model To Learn Them All," https://arxiv.org/abs/1706.05137, Jun. 2017, 10 pages.

Kingma et al., "Adam: A Method for Stochastic Optimization," https://arxiv.org/abs/1412.6980v1, Dec. 2014, 9 pages.

Krizhevsky, "One weird trick for parallelizing convolutional neural networks," https://arxiv.org/abs/1404.5997, Apr. 2014, 7 pages.

Lillicrap et al., "Continuous control with deep reinforcement learning," https://arxiv.org/abs/1509.02971v5, Feb. 2016, 14 pages.

Lin, "Self-Improving Reactive Agents Based on Reinforcement Learning, Planning and Reaching," Machine Learning, May 1992, 293-321.

Loshchilov et al., "Online Batch Selection for Faster Training of Neural Networks," https://arxiv.org/abs/1511.06343v1, Nov. 2015, 12 pages.

Mnih et al., "Asynchronous Methods for Deep Reinforcement Learning," https://arxiv.org/abs/1602.01783v1, Feb. 2016, 28 pages.

Mnih et al., "Asynchronous Methods for Deep Reinforcement Learning," International Conference on Machine Learning, Jun. 2016, 10 pages.

Mnih et al., "Human-level control through deep reinforcement learning," Nature, Feb. 2015, 518(7540):529-533.

Moore et al., "Prioritized Sweeping: Reinforcement Learning with Less Data and Less Time," Machine Learning, Oct. 1993, 13:103-130.

Nair et al., "Massively Parallel Methods for Deep Reinforcement Learning," https://arxiv.org/abs/1507.04296, Jul. 2015, 14 pages.

Office Action in Chinese Appln. No. 201880068801.8, dated Jan. 13, 2023, 28 pages (with English translation).

PCT International Preliminary Report on Patentability in International Appln. No. PCT/EP2018/079566, mailed May 7, 2020, 12 pages.

PCT International Search Report and Written Opinion in International Appln. No. PCT/EP2018/079566, mailed Feb. 4, 2019, 19 pages.

Prokhorov et al., "Adaptive Critic Designs," IEEE Transactions on Neural Networks, Sep. 1997, 8(5):997-1007.

Riedmiller, "Neural Fitted Q Iteration—First Experiences with a Data Efficient Neural Reinforcement Learning Method," European Conference on Machine Learning, Oct. 2005, 317-328.

Schaul et al., "Prioritized Experience Replay," https://arxiv.org/abs/1511.05952v2, Nov. 2015, 23 pages.

Schaul et al., "Prioritized Experience Replay," https://arxiv.org/abs/1511.05952v4, Feb. 2016, 21 pages.

Silver et al., "Concurrent Reinforcement Learning from Customer Interactions," Proceedings of the 30th International Conference on Machine Learning, Jun. 2013, 9 pages.

Silver et al., "Deterministic Policy Gradient Algorithms," Proceedings of the 31st International Conference on Machine Learning, Jun. 2014, 9 pages.

Silver et al., "Mastering the game of go with deep neural networks and tree search," Nature, Jan. 2016, 529:484-489.

Sutton, "Learning to Predict by the Methods of Temporal Differences," Machine Learning, Aug. 1988, 3:9-44.

Tassa et al., "DeepMind Control Suite," https://arxiv.org/abs/1801.00690, Jan. 2018, 24 pages.

Todorov et al., "MuJoCo: A physics engine for model-based control," 2012 IEEE/RSJ International Conference on Intelligent Robots and Systems, Oct. 2012, 5026-5033.

Uhlenbeck et al., "On the Theory of the Brownian Motion," Physical Review, Sep. 1930, 36(5):823-841.

Van Hasselt et al., "Deep Reinforcement Learning with Double Q-Learning," Thirtieth AAAI Conference on Artificial Intelligence, Mar. 2016, 2094-2100.

Van Hasselt, "Double Q-learning," Proceedings of the 23rd International Conference on Neural Information Processing Systems, Dec. 2010, 9 pages.

Wang et al., "Dueling Network Architectures for Deep Reinforcement Learning," https://arxiv.org/abs/1511.06581v3, last revised Apr. 2016, 15 pages.

Wang et al., "Sample Efficient Actor-Critic with Experience Replay," https://arxiv.org/abs/1611.01224v2, Jul. 2017, 20 pages.

Wiering et al., "Ensemble Algorithms in Reinforcement Learning," IEEE Transactions on Systems, Man, and Cybernetics, Part B (Cybernetics), Aug. 2008, 38(4): 930-936.

* cited by examiner

REINFORCEMENT LEARNING USING DISTRIBUTED PRIORITIZED REPLAY

CROSS REFERENCE TO RELATED APPLICATIONS

This application is a continuation of U.S. patent application Ser. No. 16/641,751, filed Feb. 25, 2020, which is a National Stage Application under 35 U.S.C. § 371 and claims the benefit of International Application No. PCT/EP2018/079566, filed on Oct. 29, 2018, which claims priority to U.S. Provisional Patent Application No. 62/578,384, filed on Oct. 27, 2017. The disclosure of the prior applications is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that trains a neural network that is used to select actions to be performed by a reinforcement learning agent interacting with an environment.

The subject matter described in this specification can be implemented in particular embodiments so as to realize one or more of the following advantages. The subject matter described in this specification is directed to a training system and training techniques for deep reinforcement learning at scale, which enable agents to learn more effectively and quickly from significantly more training data than previously available using existing training techniques. The system has a distributed architecture that decouples acting from learning: multiple actor computing units (or actors) interact with their own instances of the environment by selecting actions according to a shared actions selection neural network, and accumulate the resulting experience in a shared experience replay memory; and one or more learner computing units (or learners) replay samples of prioritized experience and update the action selection neural network. Both acting and learning can be distributed across multiple computing units, for example, across hundreds of CPUs or GPUs. This distributed architecture allows the trained neural network to achieve state of the art results in a wide range of discrete and continuous tasks, both in terms of wall-clock learning speed and final performance. In particular, by employing multiple actors that can generate large quantities of training data (training tuples) in parallel, the training techniques can generate training data faster than existing methods, thus reducing training time while still achieving high quality performance.

Further, the training techniques can generate a diverse set of experiences and then identify and learn from the most useful experience tuples by utilizing priorities, thereby improving performance of the trained action selection neural network. More specifically, the training system generates accurate initial priorities without any additional cost in terms of computational or wall clock time by having the actors generate initial priorities when the actors generate the experience tuples since they are already computing certain values required to compute the priorities. This technique ensures that experience data entering the replay memory has more accurate priorities (compared to prior systems that initialize priorities to the maximum priority seen so far, and only update priorities once the experience tuples and priorities are sampled). Further, by using a shared, centralized replay memory, and instead of sampling experiences uniformly like traditional system, the described techniques prioritize to sample the most useful experience data more often based on the priorities of experiences. Since priorities are shared among actors and learners, high priority data discovered by any actor can benefit the whole training system.

In particular, by sharing experiences instead of sharing gradients as in some conventional schemes, the system can batch all communications with the centralized replay memory (for example, the system can select batches comprising multiple experience tuples from the replay memory, and use the batch to update the neural network), thereby increasing the efficiency and throughput of the system. With this approach, it is possible for actors and learners to run in different data-centers without limiting performance.

The training techniques described herein are useful for not only simulated environments but also a variety of real-world applications, such as robotic arm farms, self-driving cars, online recommender systems, or other multi-user systems in which data is generated by many instances of the same environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
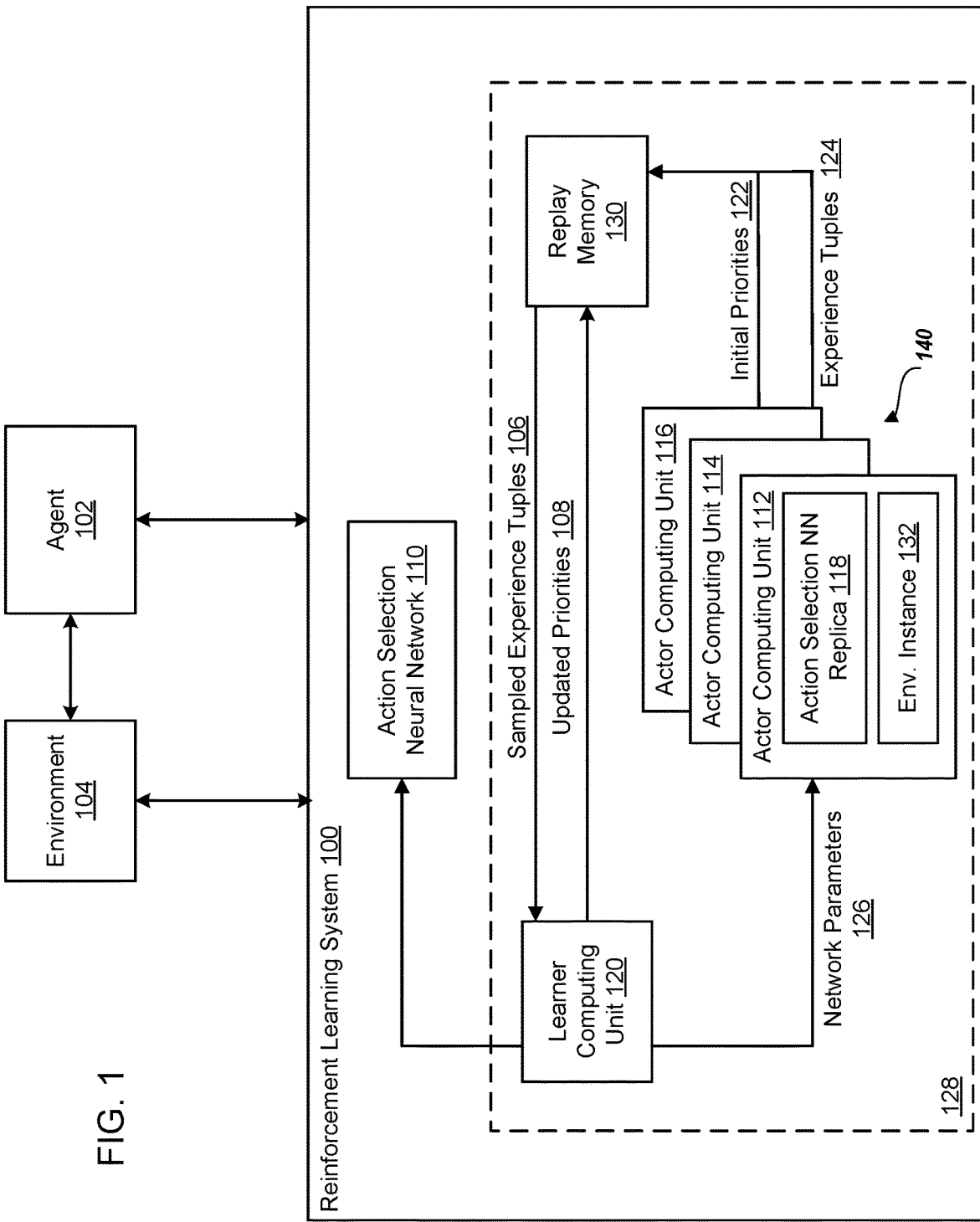
FIG. 1 shows an example reinforcement learning system.

This specification generally describes a reinforcement learning system that trains a neural network that is used to select actions to be performed by a reinforcement learning agent interacting with an environment.

In order for the agent to interact with the environment, the system receives data characterizing the current state of the environment, selects an action to be performed by the agent in response to the received data from a set of actions using an action selection neural network, and then instructs or otherwise causes the agent to perform the selected action. Data characterizing a state of the environment will be referred to in this specification as an observation. The term "reinforcement learning technique" refers to a technique in which, for each of a plurality of steps, the following sub-steps are performed: (1) based on input data characterizing the current state of the environment, the action selection neural network selects an action; (2) a reward value is generated indicative of the extent to which, when the agent performs the action, this contributes to performing a task; and (3) the neural network is updated based on the selected action, the state of the environment used to select the action, and the reward value. Typically, the plurality of steps includes one or more sequences of steps, in which an initial state of the environment is successively updated at each step. To put this another way, in each sequence of steps, the current state of the environment for a first step of the sequence is the initial state, and at each subsequent step of the sequence the current state of the environment is the state which results from performing the action selected in the previous step on the state of the environment which was current before that previous step was carried out. The particular format of the output generated by the network and the architecture of the network is dependent on the reinforcement learning technique used for the training, e.g., Q-learning, DDPG (Deep Deterministic Policy Gradients) learning, A3C (asynchronous advantage actor-critic) learning, and so on. A Q-learning technique refers to a reinforcement learning technique in which sub-step (1) is performed using a Q function which is an estimate of the reward which any given action would receive; for example by selecting (at least with a certain probability) the action which maximizes the Q function. More generally, an "n-step Q-learning technique", where n denotes an integer which is at least one, and usually greater than one, means a reinforcement learning technique in which sub-step (1) is performed using a Q function which is an estimate of rewards which a sequence of n successive actions would receive. In either case, the Q function may be implemented by a second neural network. DDPG learning and A3C learning are examples of actor-critic reinforcement learning techniques (or "actor-critic techniques" for short), in which in sub-step (3) the neural network is updated based on the output of a "critic" (critic neural network) which receives the current states and the generated reward.

In some other implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In some cases, the observations characterize states of the environment using low-dimensional feature vectors that characterize the state of the environment. In these cases, values of different dimensions of the low-dimensional feature vectors may have varying ranges.

In some other cases, the observations characterize states of the environment using high-dimensional pixel inputs from one or more images that characterize the state of the environment, e.g., images of the simulated environment or images captured by sensors of the mechanical agent as it interacts with the real-world environment.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from a continuous action space to be performed by the reinforcement learning agent 102 in response to the observation.

In particular, the reinforcement learning system 100 selects actions using an action selection neural network 110. In some implementations, the action selection neural network 110 is configured to receive an observation and to process the observation to map the observation to a next action, i.e., to a point in the continuous action space that defines an action that should be performed by the agent in response to the observation. In some other implementations, the action selection neural network 110 is configured to generate Q-values for observation-action pairs, where a Q-value for an observation-action pair represents an estimated time-discounted total future reward that the system will receive if the agent 102 performs the action in response to the observation in the pair. Given an observation, the action selection neural network 110 can select an action that yields the highest possible Q-value. In some implementations, the action selection neural network 110 can select an action to be performed by the agent 102 in response an observation by using an action selection policy (exploration policy). For example, when the set of possible actions to be performed by the agent is discrete, the action selection neural network 110 can use an epsilon-greedy policy. In some other implementations, the action selection neural network 110 can select actions according to a probability distribution over possible actions.

To allow the agent 102 to effectively interact with the environment, the reinforcement learning system 100 trains the action selection neural network 110 to determine trained values of the parameters of the action selection neural network 110.

Once the action selection neural network 110 has been trained, the reinforcement learning system 100 can effectively use the action selection neural network 110 to select actions to be performed by the agent 102. In particular, when an observation is received, the reinforcement learning system 100 can process the observation using the action selection neural network 110 to map the observation to a new action in accordance with the trained values of the parameters of the action selection neural network 110 and then direct the agent 102 to perform the new action in response to the observation, i.e., by sending instructions to the agent 102 that cause the agent to perform the new action.

To assist in the training of the action selection neural network 110, the reinforcement learning system 100 maintains training components 128 that include a replay memory 130, one or more learner computing units (e.g., the learner computing unit 120), and multiple actor computing units 140 that include, for example, actor computing units 112, 114, and 116. Generally, a computing unit may be, e.g., a computer, a core within a computer having multiple cores, or other hardware or software, e.g., a dedicated thread, within a computer capable of independently performing operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs.

The replay memory 130 is a shared memory accessible to each of the learner and actor computing units. The replay memory 130 stores experience tuples generated by the actor computing units 140. Each experience tuple in the replay memory 130 includes a training observation that characterizes a training state of an instance of the environment, an action selected by an actor computing unit for the agent 102 to perform in response to the training observation, and a training reward received by the system 100 in response to the agent 102 performing the selected action. In addition, the replay memory 130 stores a priority for each of the experience tuples. One or more experience tuples may have the same priority. A priority for an experience tuple represents a level of usefulness of the experience tuple in training the action selection neural network 110. The higher the priority, the more useful the experience tuple will likely be in training the action selection neural network 110. Therefore, the learner computing unit 120 more frequently samples tuples with higher priority from the replay memory 130 during the training of the action selection neural network 110.

During the training of the action selection neural network 110, each of the actor computing units 140 is configured to maintain a respective replica of the action selection neural network 118 and to control a respective instance of the agent 102 as the agent instance interacts with a respective instance of the environment 104. For example, as shown in FIG. 1, the actor computing unit 112 maintains an action selection neural network replica 118 and controls an agent interacting with an environment instance 132.

Each of the actor computing units 140 is configured to repeatedly perform a plurality of actor operations in order to repeatedly generate experience tuples and priorities for these experience tuples and store them in the replay memory 130. For convenience, the set of actor operations are described in detail below as being performed by the actor computing unit 112.

The actor computing unit 112 is configured to receive an observation characterizing a current state of the environment instance 132 and to select an action to be performed by the agent 102 using the action selection neural network replica 118 and in accordance with current values of the network parameters. The actor computing unit 112 then obtains transition data characterizing the environment instance subsequent to the agent 102 performing the selected action. For example, the transition data includes the next observation characterizing the next state of the environment instance 132, i.e., the state that the environment instance 132 transitioned into as a result of the agent performing the selected action. The transition data also includes a reward which is a numeric value that is received from the environment as a result of the agent 102 performing the selected action. The actor computing unit 112 then generates an experience tuple from the observation, the selected action, and the transition data. An experience tuple, which can be denoted as $(S_t, A_t, r_{t+1}, S_{t+1})$, includes the current observation $S_t$, the selected action $A_t$, and the reward $r_{t+1}$, and the next observation $S_{t+1}$ that characterizes the next state of the environment after the selected action was performed. The experience tuple may include a discount factor $\gamma_{t+1}$ for the reward. The discount factor $\gamma_{t+1}$ can be a constant.

In some implementations, instead of performing only a single action step, the actor computing unit 112 can generate additional actions to be performed by the agent in response to subsequent observations using the action selection neural network replica to generate an n-step transition, where n is the number of action steps represented by the transition. In these implementations, the actor computing unit 112 generates an experience tuple from the n action steps, i.e., from the observations and their corresponding selected actions and transition data at each of the action steps. In this case, the experience tuple is also referred to as an n-step transition. For example, in a 3-step transition, the actor computing unit 112 generates an experience tuple that includes $(S_t, A_t, r_{t+1}, S_{t+1}, A_{t+1}, r_{t+2}, S_{t+2}, A_{t+2}, r_{t+3}, S_{t+3})$. In some implementations, rather than including all of the information from the n action steps, the n-step transition can include only the first observation at step $S_t$, the first action $A_t$, a composite reward, and the last observation, $S_{t+n}$. The composite reward can be a time discounted sum of the rewards received starting from the first observation and until the last observation is received, i.e., a sum of the rewards weighted by their corresponding discount factor. A single step transition is a special case of the n-step transition with n=1. In the single step transition, the experience tuple includes only one observation and the corresponding selected action, reward, and next observation as described above.

The actor computing unit 112 then determines a priority for the experience tuple, and stores the experience tuple 124 in association with the priority 122 in the replay memory 130.

Other actor computing units can perform similar actor operations to generate other experience tuples and corresponding priorities. In some implementations, the actor computing units perform the actor operations asynchronously from each other actor computing unit.

In some implementations, two or more of the actor computing units can select actions using different exploration policies. For example, when the set of possible actions to be performed by the agent is discrete, the different exploration policies can be epsilon-greedy policies with different values of epsilon. For instance, each actor computing unit $i \in \{0, \ldots, N-1\}$ can execute an $\epsilon_i$-greedy policy where $$\epsilon_i = \epsilon^{1+\frac{i}{N-1}\alpha}$$

with $\epsilon$ and $\alpha$ are constants, e.g., $\epsilon=0.4$, $\alpha=7$; $\epsilon=0.1$, $\alpha=3$; or $\epsilon=0.5$, $\alpha=9$. As another example, when the set of possible actions to be performed by the agent is continuous, each actor computing unit can add noise sampled from a noise distribution to the action selected by the action selection neural network before performing the noisy action. In these cases, two or more of the actor computing units can sample from different noise distributions, or apply different constant values to the sampled noise before adding the noise to the selected action.

The actor computing units can periodically receive updated values of network parameters from the one or more learner computing units and replace the current values of the network parameters used by the replica with the updated values.

Actor operations are described in more detail below with reference to FIG. 2.

During the training of the action selection neural network 110, each of the one or more learner computing units, for example, the learner computing unit 120, is configured to repeatedly perform a plurality of learner operations in order to repeatedly update the network parameters of the action selection neural network 110.

In particular, the learner computing unit 120 is configured to sample a batch of experience tuples 106 from the replay memory 130. An experience tuple may include transition data for one observation in the single step transition case, or data generated from transition data from multiple observations in the n-step transition case. The sampling of the batch of experience tuples is biased by the priorities for the experience tuples in the replay memory 130. In particular, the learner computer samples experience tuples with higher priority more frequently than experience tuples with lower priority.

The learner computing unit 120 (hereafter referred to as the learner 120) determines, using the sampled experience tuples, an update to the network parameters of the action selection neural network 110 using a reinforcement learning technique.

For example, the reinforcement learning technique can be an n-step Q learning technique (e.g., DQN technique). Using this technique, the learner 120 adjusts the current values of network parameters of the action selection neural network 110 to minimize a loss function defined as follow:

$$l_t(\theta) = \frac{1}{2}(G_t - q(S_t, A_t, \theta))^2 \quad (1)$$

where $q(.\,,\,.\,,\,\theta)$, also called a function approximator, represents the action selection neural network 110 (which is a Q-network in this example) and is configured to compute Q-values. A Q value $q(S_t, A_t, \theta)$ represents an estimated time-discounted total future reward that the learner computing unit will receive when the agent performs an action $A_t$ in response to an observation $S_t$. $G_t$ is a sampled reward computed for an n-step transition as follows:

$$G_t = R_{t+1} + \gamma R_{t+2} + \ldots + \gamma^{n-1} R_{t+n} + \gamma^n q\underbrace{\left(S_{t+n}, \operatorname*{argmax}_a q(S_{t+n}, a, \theta), \theta^-\right)}_{\text{double-Q bootstrap value}} \quad (2)$$
$$\underbrace{\phantom{G_t = R_{t+1} + \gamma R_{t+2} + \ldots + \gamma^{n-1} R_{t+n} + \gamma^n q\left(S_{t+n}, \operatorname*{argmax}_a q(S_{t+n}, a, \theta), \theta^-\right)}}_{\text{multi-step return}}$$

where t is a time index for an experience tuple (in this case an n-step transition) sampled from the replay memory starting with state $S_t$ and action $A_t$. $\theta^-$ denotes parameters of a target network, which is the same network as the corresponding action selection neural network 110, but the parameter values of the target network are constrained to change more slowly during the training process to help improve the stability of the training. n is the number of action steps represented by the transition.

As another example, the learner 120 can use an actor-critic reinforcement learning technique to update the network parameters of the action selection neural network 110.

When using the actor-critic technique (e.g., Deterministic Policy Gradients (DPG) method), the learner 120 can jointly adjust the current values of network parameters of the action selection neural network 110 (also called an actor neural network in this case) and the current values of network parameters of a critic neural network to minimize a loss function defined by $$l_t(\psi) = \frac{1}{2}(G_t - q(S_t, A_t, \psi))^2, \quad (3)$$

where $q(S_t, A_t, \psi)$, also called a function approximator, represents the critic neural network configured to generate an expected reward received after the agent performs an action $A_t$ in response to a given observation $S_t$ based on current values of network parameters $\psi$ of the critic neural network. $G_t$ is a sampled reward computed from a sampled experience tuple (in this case an n-step transition) as follows:

$$G_t = \underbrace{R_{t+1} + \gamma R_{t+2} + \ldots + \gamma^{n-1} R_{t+n} + \gamma^n q(S_{t+n}, \pi(S_{t+n}, \phi^-), \psi^-)}_{\text{multi-step return}} \quad (4)$$

where t is a time index of an experience tuple sampled from the replay memory starting with state $S_t$ and action $A_t$, and where n is the number of observations included in the experience tuple. In this case, $\pi(S_t, \phi)$ represents the actor neural network that has network parameters $\phi$ and is configured to determine action $A_t$ to be performed by an agent in response to a given observation at state $S_t$. $\phi^-$ and $\psi^-$ refer to parameters of respective target networks which are duplicates respectively of the parameters $\phi$ and $\psi$ but change more slowly (e.g. are only updated after multiple updates of $\phi$ and $\psi$).

The learner 120 can determine for each sampled experience tuple a respective updated priority. The learner 120 may then update the shared memory to associate the updated priorities with the sampled experience tuples.

In particular, to determine an updated priority for a sampled n-step transition, the learner 120 determines an n-step temporal difference (TD) error. The TD error is the difference between: a) a prediction of expected long term value based on the received rewards from step t to t+n during the n steps of experience and a value returned by the function approximator at the state after these n steps, and b) a value returned by the function approximator at the beginning of the n steps without the observed rewards. The quantity a) is denoted by $G_t$ and can be computed by using Eq. (2) in the case where the Q-step learning technique is used, or by using Eq. (4) in the case where actor-critic technique is used. The quantity b) is denoted as $q(S_t, A_t, \theta)$ and $q(S_t, A_t, \psi)$ in these respective cases. The priority can be an absolute value of the TD error.

For the single step transition case where each sampled experience tuple has only one observation, the learner 120 can determine an TD error and priority for each sampled experience tuple using the same method above with n=1.

To maintain the capacity of replay memory within a threshold, the learner computing unit 120 can determine whether criteria for removing any experience tuples from the shared memory are satisfied. When the criteria are satisfied, the learner computing unit 120 updates the replay memory 130 to remove one or more of the tuples from the replay memory 130.

The learner computing unit 120 can determine whether criteria for updating the actor computing units are satisfied. When the criteria are satisfied, the learner computing unit 120 can transmit the updated network parameter values 126 to the actor computing units.

The learner operations are described in more detail below with reference to FIG. 3. By repeatedly performing the actor operations and the learner operations, the system 100 iteratively adjusts the values of the network parameters from initial values of the parameters to trained values. Once the trained values have been determined, the system 100 can use the neural network 110 to control the agent 102 or can provide the trained values of the network parameters to another system for use in controlling the agent 102.

Figure 2:
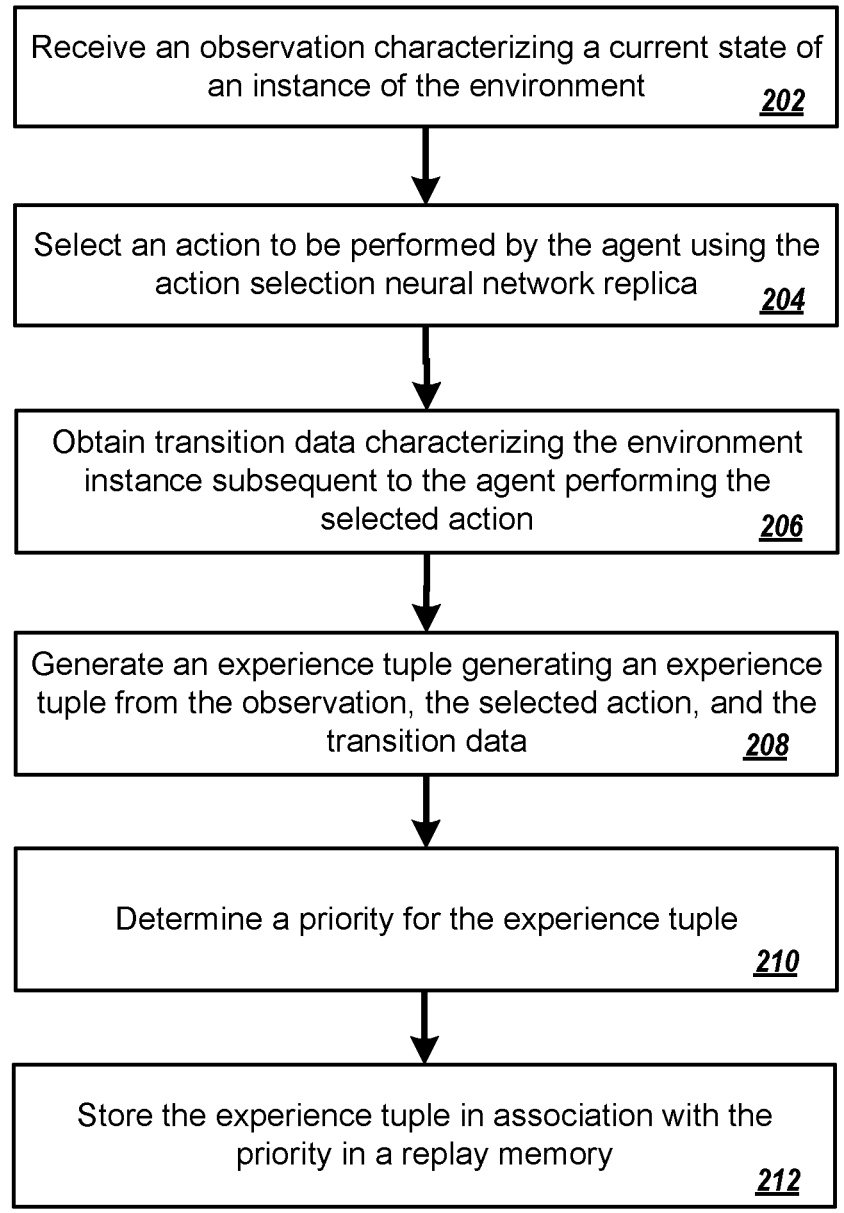
FIG. 2 is a flow diagram of an example process for generating and storing experience tuples and priorities in a replay memory.

FIG. 2 illustrates an example process for generating and storing experience tuples and priorities in a shared memory (also referred to as a replay memory) during training. For example, a reinforcement learning system, e.g., the reinforcement learning system 100 of FIG. 1, appropriately programmed in accordance with this specification, can perform the process 200 by using an actor computing unit such as the actor computing unit 112, 114, or 116 of FIG. 1.

The actor computing unit receives an observation characterizing a current state of an instance of the environment (step 202).

The actor computing unit selects an action to be performed by the agent using a replica of an action selection neural network (e.g., the action selection neural network 110 of FIG. 1) and in accordance with current values of the network parameters of the action selection neural network replica (step 204).

Specifically, in some implementations, the action selection neural network replica can be a Q-network that generates Q-values $q(S_t, A_t, \theta)$. A Q-value $q(S_t, A_t, \theta)$ represents an estimated time-discounted total future reward that the system will receive if the agent performs an action $A_t$ in response to an observation $S_t$. The estimated time-discounted total future reward is determined based on the current values of parameters $\theta$ of the action selection neural network. In some cases, the actor computing unit can select an action $\alpha$ such that the Q value $q(S_t, \alpha, \theta)$ is maximized. In some other cases, instead of using the highest Q-value, the actor computing unit can randomly choose an action with probability 1-$\epsilon$. In some other cases, the actor computing unit can select an action by using an epsilon-greedy policy or other action selection policy. Specifically, when the set of possible actions to be performed by the agent is discrete, the actor computing unit can select an action using an $\epsilon$-greedy policy. When the set of possible actions to be performed by the agent is continuous, the actor computing unit can add noise sampled from a noise distribution to the action selected by the action selection neural network replica before performing the noisy action.

In some other implementations, the action selection neural network replica can be an actor neural network $\pi(S_t, \phi)$ that is configured to generate an action $A_t$ to be performed by the agent in response to a given observation $S_t$ by using network parameters that are actor parameters $\phi$. During training, the actor neural network is trained jointly with a critic neural network $q(s, \alpha, \doteq)$ having network parameters $\psi$ and that generates Q-values. After training, the actor computing unit can select an action to be performed by the agent using the trained actor neural network in accordance with trained values of parameters $\phi$ of the actor neural network.

In some other implementations, the action selection neural network replica is a neural network that receives an observation and processes the observation to generate an output that defines a probability distribution over possible actions. For example, when the action space is discrete, the output can include a respective probability for each action. When the action space is continuous, the output can be parameters of the probability distribution over the possible actions.

Once the actor computing unit has selected the action, the actor computing unit can direct the agent to perform the selected action in response to the current observation, i.e., by sending instructions to the agent that cause the agent to perform the selected action.

After the agent has performed the selected action, the actor computing unit obtains transition data characterizing the environment instance subsequent to the agent performing the selected action (step 206).

For example, the transition data can include $(r_{t+1}, S_{t+1})$, where $S_{t+1}$ represents the next observation characterizing the next state of the environment instance, i.e., the state that the environment instance transitioned into as a result of the agent performing the selected action; and $r_{t+1}$ represents a reward which is a numeric value that is received from the environment as a result of the agent performing the selected action $A_t$ in response to the observation $S_t$.

The actor computing unit generates an experience tuple from the observation, the selected action, and the transition data (step 208). An experience tuple, which can be denoted as $(S_t, A_t, r_{t+1}, S_{t+1})$, includes the current observation $S_t$, the selected action $A_t$, the reward $r_{t+1}$, and the next observation $S_{t+1}$ that characterizes the next state of the environment after the selected action was performed. In some cases, the experience tuple may include a discount factor $\gamma_{t+1}$ for the reward. The discount factor $\gamma_{t+1}$ can be a constant.

In some implementations, instead of performing only a single action step, the actor computing unit can generate additional actions to be performed by the agent in response to subsequent observations using the action selection neural network replica to generate an n-step transition, where n is the number of action steps represented by the transition. In these implementations, the actor computing unit generates an experience tuple from the n action steps, i.e., from the observations and their corresponding selected actions and transition data at each of the action steps. In this case, the experience tuple is also referred to as an n-step transition. For example, in a 3-step transition, the actor computing unit generates an experience tuple that includes $(S_t, A_t, r_{t+1}, S_{t+1}, A_{t+1}, r_{t+2}, S_{t+2}, A_{t+2}, r_{t+3}, S_{t+3})$. In some implementations, rather than including all of the information from the n action steps, the n-step transition can include only the first observation at step $S_t$, the first action $A_t$, a composite reward, and the last observation, $S_{t+n}$. The composite reward can be a time discounted sum of the rewards received starting from the first observation and until the last observation is received, i.e., a sum of the rewards weighted by their corresponding discount factor. A single step transition is a special case of the n-step transition with n=1. In the single step transition, the experience tuple includes only one observation and the corresponding selected action, reward, and next observation as described above.

The actor computing unit determines an initial priority for the experience tuple (step 210). In particular, the actor computing unit (also referred to as "the actor") determines a learning error for the experience tuple according to a reinforcement learning technique. The actor then determines the initial priority from the learning error. For example, the actor can determine a learning error which is a temporal difference (TD) error for the experience tuple. In this case, the priority can be an absolute value of the TD error.

In particular, to determine an initial priority for an experience tuple that is an n-step transition, the actor determines an n-step temporal difference (TD) error by computing the difference between: a) an prediction of expected long term value based on the received rewards from step t to t+n during the n steps of experience and a value returned by the function approximator at the state after these n steps, and b) a value returned by the function approximator at the beginning of the n steps without the observed rewards. The quantity a) is denoted by $G_t$ and can be computed by using Eq. (2) in the case where the Q-step learning technique is used, or by using Eq. (4) in the case where actor-critic technique is used. The quantity b) is denoted as $q(S_t, A_t, \theta)$ and $q(S_t, A_t, \psi)$ in these respective cases. The Q-values estimates from which the initial priorities are derived are based on the actor's copy of the action selection neural network parameters at the time the corresponding state was obtained from the environment instance, rather than the latest version of the network parameters available at the learner.

For the single step transition case where the experience tuple has only one observation, the actor can determine an TD error and priority for each sampled experience tuple using the same method above with n=1.

The actor computing unit stores the experience tuple in association with the priority in the replay memory (step 212).

In some implementations, the actor computing unit can repeatedly perform steps 202-208 until B experience tuples have been generated, where B is a predetermined number. In these implementations, the actor computing unit can determine a priority for the group of B experience tuples. The actor computing unit then stores B experience tuples (also referred to as an "experience" in the description associated with FIG. 3 below) in association with the priority to the replay memory.

In some implementations, to reduce memory and bandwidth requirements, the actor computing unit can compress experience tuples, for example, by using the PNG codec, when storing the experience tuples in the replay memory.

The actor computing unit can periodically receive updated values of the network parameters of the action selection neural network replica from one or more learner computing units, and replace the current values of the network parameters used by the replica with the updated values.

For example, the actor computing unit can receive updated values from the one or more learner computing units after the one or more leaner computing units have performed a predetermined number of learning steps (e.g., 50, 100, or 200 steps), or after a predetermined time period has passed (e.g., after 1, 2, 2.5, 2.8, or 5 seconds).

Figure 3:
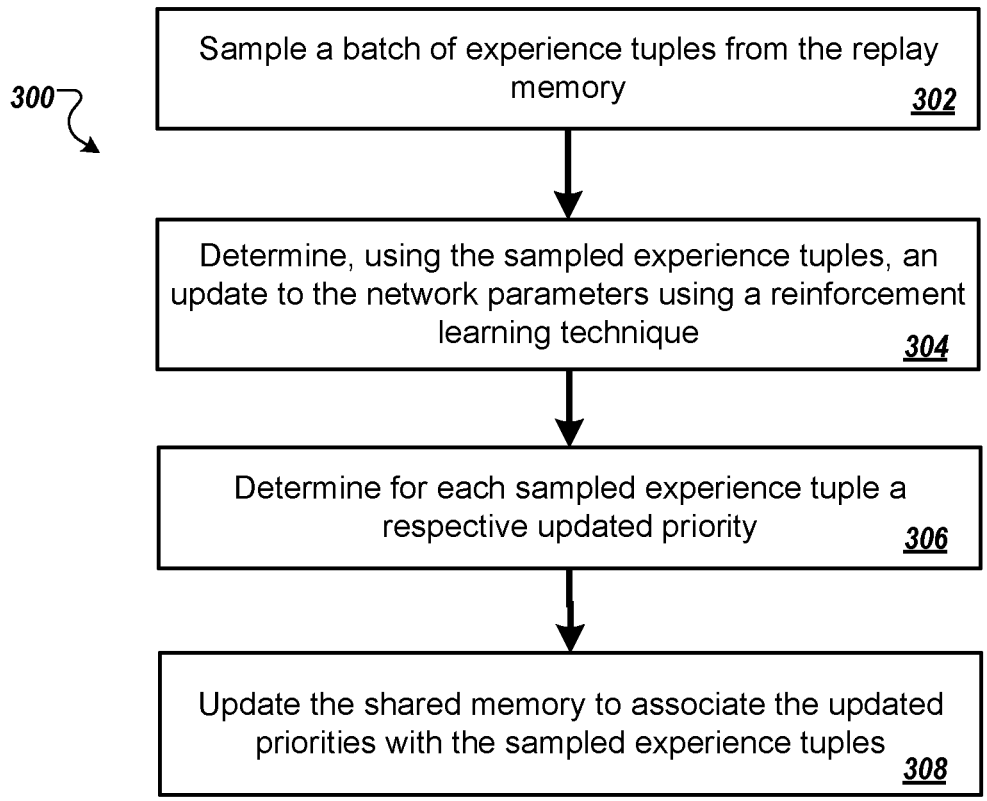
FIG. 3 is a flow diagram of an example process for updating network parameters of an action selection neural network.

FIG. 3 illustrates an example process for updating network parameters of an action selection neural network. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300 by using a learner computing unit such as the learner computing unit 120 of FIG. 1.

The learner computing unit samples a batch of experience tuples from the shared memory (step 302). An experience tuple may include transition data for one observation in the single step transition case, or data generated from transition data from multiple observations in the n-step transition case. The sampling is biased by the priorities for the experience tuples in the shared memory. That is, the learner computing unit samples experience tuples with higher priority more frequently than experience tuples with lower priority.

More specifically, the probability of sampling an experience tuple can be defined as $p_k^\alpha / \Sigma_k p_k^\alpha$ where $p_k^\alpha$ is the priority of the experience tuple with key k and $\Sigma_k p_k^\alpha$ is the sum of all priorities in the shared memory, where each priority is raised to an exponent $\alpha$. The exponent $\alpha$ controls the amount of prioritization. The exponent $\alpha$ can be a constant or can vary during training. When $\alpha$ is zero, the sampling is uniform.

After the batch of experience tuples is sampled, the learner computing unit (also referred to as the learner) determines, using the sampled experience tuples, an update to the network parameters using a reinforcement learning technique (step 304).

For example, the reinforcement learning technique can be an n-step Q learning technique (e.g., DQN technique). Using this technique, the learner adjusts the current values of network parameters of the action selection neural network to minimize a loss function defined as follow:

$$l_t(\theta) = \frac{1}{2}(G_t - q(S_t, A_t, \theta))^2, \qquad (1)$$

where $q(.,.,\theta)$ represents the action selection neural network 110 (which is a Q-network in this example) and is configured to compute Q-values. A Q value $q(S_t, A_t, \theta)$ represents an estimated time-discounted total future reward that the learner computing unit will receive when the agent performs an action $A_t$ in response to an observation $S_t$. $G_t$ is a sampled reward computed for an n-step transition as follows:

$$G_i = R_{t+1} + \gamma R_{t+2} + \ldots + \gamma^{n-1} R_{t+n} + \gamma^n \underbrace{q\left(S_{t+n}, \underset{a}{\mathrm{argmax}}\ q(S_{t+n}, a, \theta), \theta^-\right)}_{\text{double-Q bootstrap value}}, \qquad (2)$$

$$\underbrace{\phantom{G_i = R_{t+1} + \gamma R_{t+2} + \ldots + \gamma^{n-1} R_{t+n} + \gamma^n q(S_{t+n}, \mathrm{argmax}\ q(S_{t+n}, a, \theta), \theta^-)}}_{\text{multi-step return}}$$

where t is a time index for an experience tuple (in this case an n-step transition) sampled from the replay memory starting with state $S_t$ and action $A_t$. $\theta^-$ denotes parameters of a target network, which is the same network as the corresponding action selection neural network 110, but the parameter values of the target network are constrained to change more slowly during the training process to help improve the stability of the training. n is the number of observations in the experience tuple.

As another example, the learner can use an actor-critic reinforcement learning technique to update the network parameters of the action selection neural network.

When using the actor-critic technique (e.g., Deterministic Policy Gradients (DPG) method), the learner can jointly adjust the current values of network parameters of the action selection neural network (also called an actor neural network in this case) and the current values of network parameters of a critic neural network to minimize a loss function defined by $$l_t(\psi) = \frac{1}{2}(G_t - q(S_t, A_t, \psi))^2, \qquad (3)$$

where $q(S_t, A_t, \psi)$ represents the critic neural network configured to generate an expected reward received after the agent performs an action $A_t$ in response to a given observation $S_t$ based on current values of network parameters $\psi$ of the critic neural network. $G_t$ is a sampled reward computed from a sampled experience tuple (in this case an n-step transition) as follows:

$$G_i = \underbrace{R_{t+1} + \gamma R_{t+2} + \ldots + \gamma^{n-1} R_{t+n} + \gamma^n q(S_{t+n}, \pi(S_{t+n}, \phi^-), \psi^-)}_{\text{multi-step return}} \qquad (4)$$

where t is a time index of an experience tuple sampled from the replay memory starting with state $S_t$ and action $A_t$, and where n is the number of observations included in the experience tuple. In this case, $\pi(S_t, \phi)$ represents the actor neural network that has network parameters $\phi$ and is configured to determine action $A_t$ to be performed by an agent in response to a given observation at state $S_t$. $\phi^-$ and $\psi^-$ refer to parameters of respective target networks which are duplicates respectively of the parameters $\phi$ and $\psi$ but change more slowly (e.g. are only updated after multiple updates of $\phi$ and $\psi$.

The learner computing unit can determine for each sampled experience tuple a respective updated priority (step 306). For example, the learner computing unit can determine a learning error for each sampled experience tuple and determine the priority from the learning error. For example, the learner computing unit can determine a temporal difference (TD) error for each sampled experience tuple and determine the priority for each sampled experience from the TD error. For instance, the priority is an absolute value of the TD error.

In particular, to determine an updated priority for a sampled n-step transition, the learner determines an n-step temporal difference (TD) error. The TD error is the difference between: a) a prediction of expected long term value based on the received rewards from step t to t+n during the n steps of experience and a value returned by the function approximator at the state after these n steps, and b) a value returned by the function approximator at the beginning of the n steps without the observed rewards. The quantity a) is denoted by $G_t$ and can be computed by using Eq. (2) in the case where the Q-step learning technique is used, or by using Eq. (4) in the case where actor-critic technique is used. The quantity b) is denoted as $q(S_t, A_t, \theta)$ and $q(S_t, A_t, \psi)$ in these respective cases. The priority can be an absolute value of the TD error.

For the single step transition case where each sampled experience tuple has only one observation, the learner 120 can determine an TD error and priority for each sampled experience tuple using the same method above with n=1.

The learner computing unit then updates the replay memory to associate the updated priorities with the sampled experience tuples (step 308).

To maintain the capacity of the replay memory within a threshold, the learner computing unit can determine whether criteria for removing any experience tuples from the shared memory are satisfied. When the criteria are satisfied, the learner computing unit updates the replay memory to remove one or more of the tuples from the replay memory.

For example, after performing a certain number of learning steps (e.g., after every 50, 100, 200, or 500 steps), the learner computing unit can check whether the capacity threshold of the replay memory has been reached. If the capacity threshold is reached, the learner computing unit can remove one or more tuples from the replay memory, for example, in a first in first out order to maintain the capacity within the threshold.

In some implementations, the learner computing unit can determine whether criteria for updating the actor computing units are satisfied. When the criteria are satisfied, the learner computing unit can transmit the updated parameter values to the actor computing units. For example, the learner computing unit can update the actor computing units after the learner computing units have performed a predetermined number of learning steps (e.g., 50, 100, or 200 steps), or after a predetermined time period has passed (e.g., after 1, 2, 2.5, 2.8, or 5 seconds).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for training an action selection neural network having a plurality of network parameters and used to select actions to be performed by an agent interacting with an environment, the system being implemented using one or more computers and comprising:
   a plurality of actor units, each of the actor units configured to maintain a respective replica of the action selection neural network and to perform actor operations in parallel with other actor units, the actor operations comprising:
      receiving an observation characterizing a current state of an instance of the environment,
      selecting an action to be performed by the agent using the action selection neural network replica and in accordance with current values of the network parameters,
      obtaining transition data characterizing the environment instance subsequent to the agent performing the selected action,
      generating a new experience tuple from the observation, the selected action, and the transition data,
      determining an initial priority for the new experience tuple, comprising:
         determining a learning error for the new experience tuple according to a reinforcement learning technique, and determining the initial priority from the learning error; and
      storing the new experience tuple and the initial priority that is determined for the new experience tuple based on the learning error.

2. The system of claim 1, wherein the new experience tuple and the initial priority are stored in a shared memory.

3. The system of claim 2, further comprising one or more learner computing units, wherein each of the one or more learner computing units is configured to perform learner operations comprising:
   sampling a batch of experience tuples from the shared memory based on the priorities for the experience tuples in the shared memory; and
   determining, using the sampled experience tuples, an update to the network parameters using the reinforcement learning technique.

4. The system of claim 3, wherein the learner operations further comprise:
   determining for each sampled experience tuple a respective updated priority; and
   updating the shared memory to associate the updated priorities with the sampled experience tuples.

5. The system of claim 3, wherein the learner operations further comprise:
   determining whether criteria for removing any experience tuples from the shared memory are satisfied; and
   when the criteria are satisfied, updating the shared memory to remove one or more of the tuples.

6. The system of claim 3, wherein the learner operations further comprise:
   determining whether criteria for updating the actor units are satisfied; and
   when the criteria are satisfied, transmitting updated parameter values to the actor units.

7. The system of claim 1, wherein the initial priority is an absolute value of the learning error.

8. The system of claim 1, wherein two or more of the actor units select actions using different exploration policies.

9. The system of claim 8, wherein the different exploration policies are epsilon-greedy policies with different values of epsilon.

10. The system of claim 1, wherein the reinforcement learning technique is an n-step Q learning technique or an actor-critic technique.

11. The system of claim 1, wherein obtaining transition data characterizing the environment instance subsequent to the agent performing the selected action comprises:
   selecting additional actions to be performed by the agent in response to subsequent observations using the action selection neural network replica to generate an n-step transition.

12. One or more non-transitory computer readable storage media storing instructions that when executed by one or more computers cause the one or more computers to perform operations for training an action selection neural network having a plurality of network parameters and used to select actions to be performed by an agent interacting with an environment, the operations comprising:
   maintaining a plurality of actor units, each of the actor units configured to maintain a respective replica of the action selection neural network and to perform actor operations in parallel with other actor units; and
   for each of the plurality of actor units, performing actor operations using the actor unit, the actor operations comprising:
      receiving an observation characterizing a current state of an instance of the environment,
      selecting an action to be performed by the agent using the action selection neural network replica and in accordance with current values of the network parameters,
      obtaining transition data characterizing the environment instance subsequent to the agent performing the selected action,
      generating a new experience tuple from the observation, the selected action, and the transition data,
      determining an initial priority for the new experience tuple, comprising:
   determining a learning error for the new experience tuple according to a reinforcement learning technique, and determining the initial priority from the learning error; and
      storing the new experience tuple and the initial priority that is determined for the new experience tuple based on the learning error.

13. A computer-implemented method for training an action selection neural network having a plurality of network parameters and used to select actions to be performed by an agent interacting with an environment, the method comprising:
   maintaining a plurality of actor units, each of the actor units configured to maintain a respective replica of the action selection neural network and to perform actor operations in parallel with other actor units; and
   for each of the plurality of actor units, performing actor operations using the actor unit, the actor operations comprising:
      receiving an observation characterizing a current state of an instance of the environment, selecting an action to be performed by the agent using the action selection neural network replica and in accordance with current values of the network parameters, obtaining transition data characterizing the environment instance subsequent to the agent performing the selected action, generating a new experience tuple from the observation, the selected action, and the transition data, determining an initial priority for the new experience tuple, comprising:

determining a learning error for the new experience tuple according to a reinforcement learning technique, and determining the initial priority from the learning error; and storing the new experience tuple and the initial priority that is determined for the new experience tuple based on the learning error.

14. The method of claim 13, wherein the new experience tuple and the initial priority are stored in a shared memory.

15. The method of claim 14, further comprising:
maintaining one or more learner computing units; and
for each of the one or more learner computing units:
sampling, using the learner computing unit, a batch of experience tuples from the shared memory based on the priorities for the experience tuples in the shared memory; and
determining, using the sampled experience tuples, an update to the network parameters using the reinforcement learning technique.

16. The method of claim 15, wherein for each of the one or more learner computing units, the method further comprises:

determining for each sampled experience tuple a respective updated priority; and updating, using the learner computing unit, the shared memory to associate the updated priorities with the sampled experience tuples.

17. The method of claim 15, wherein for each of the one or more learner computing units, the method further comprises:

determining whether criteria for removing any experience tuples from the shared memory are satisfied; and when the criteria are satisfied, updating, using the learner computing unit, the shared memory to remove one or more of the tuples.

18. The method of claim 15, wherein the reinforcement learning technique is an n-step Q learning technique or an actor-critic technique.

19. The method of claim 15, wherein for each of the one or more learner computing units, the method further comprises:

determining whether criteria for updating the actor units are satisfied; and when the criteria are satisfied, transmitting updated parameter values to the actor units.

20. The method of claim 15, wherein obtaining transition data characterizing the environment instance subsequent to the agent performing the selected action comprises:

selecting additional actions to be performed by the agent in response to subsequent observations using the action selection neural network replica to generate an n-step transition.

* * * * *